(12) United States Patent
Behrens et al.

(10) Patent No.: US 8,720,828 B2
(45) Date of Patent: May 13, 2014

(54) EXTENDED PLUG COLD PLATE

(75) Inventors: William W. Behrens, St. Louis, MO (US); Andrew R. Tucker, Glendale, MO (US)

(73) Assignee: The Boeing Company, Chicago, IL (US)

(*) Notice: Subject to any disclaimer, the term of this patent is extended or adjusted under 35 U.S.C. 154(b) by 743 days.

(21) Appl. No.: 12/630,699

(22) Filed: Dec. 3, 2009

(65) Prior Publication Data

US 2011/0133026 A1 Jun. 9, 2011

(51) Int. Cl.
*B64C 1/00* (2006.01)

(52) U.S. Cl.
USPC .......................................................... 244/133

(58) Field of Classification Search
USPC .......................................... 244/133; 165/164
See application file for complete search history.

(56) References Cited

U.S. PATENT DOCUMENTS

| | | |
|---|---|---|
| 3,307,616 A | 3/1967 | Giger |
| 3,452,553 A | 7/1969 | Dershin et al. |
| 3,880,969 A | 4/1975 | Latos |
| 4,222,434 A * | 9/1980 | Clyde |
| 4,420,462 A | 12/1983 | Clyde |
| 4,884,168 A | 11/1989 | August et al. |
| 4,884,169 A | 11/1989 | Cutchaw |
| 5,270,572 A | 12/1993 | Nakajima et al. |
| 5,349,831 A | 9/1994 | Daikoku et al. |
| 5,388,635 A | 2/1995 | Gruber et al. |
| 5,744,252 A | 4/1998 | Rasky et al. |
| 5,941,302 A * | 8/1999 | Hattori et al. |
| 5,978,220 A | 11/1999 | Frey et al. |
| 6,006,824 A * | 12/1999 | Hattori et al. |
| 6,089,505 A | 7/2000 | Gruensfelder et al. |
| 6,196,307 B1 | 3/2001 | Ozmat |
| 6,411,508 B1 | 6/2002 | Kang et al. |
| 6,478,082 B1 | 11/2002 | Li |
| 6,840,307 B2 | 1/2005 | Eesley et al. |
| 6,870,736 B2 | 3/2005 | Lee et al. |
| 6,892,798 B2 * | 5/2005 | Lee et al. ................. 165/104.12 |

(Continued)

FOREIGN PATENT DOCUMENTS

| | | |
|---|---|---|
| EP | 0843082 A1 | 5/1998 |
| EP | 1263040 A2 | 12/2002 |

(Continued)

OTHER PUBLICATIONS

Haack et al., Novel Lightweight Metal Foam Heat Exchangers, Porvair Fuel Cell Technology, Inc. and The Department of Engineering, University of Cambridge, UK. (7 pgs).

(Continued)

*Primary Examiner* — Valentina Xavier
(74) *Attorney, Agent, or Firm* — Toler Law Group, PC

(57) ABSTRACT

Heat exchange systems, devices and methods are provided. A particular heat exchange device includes a housing defining an inlet and an outlet. The heat exchange device also includes at least one ceramic foam member inside the housing. The at least one ceramic foam member defines a plurality of pores. The heat exchange device also includes a plurality of extended plugs that extend from a first side of the housing through the at least one ceramic foam member to a second side of the housing. The first side of the housing is spaced apart from the at least one ceramic foam member by first ends of the plurality of extended plugs.

21 Claims, 9 Drawing Sheets

(56) References Cited

U.S. PATENT DOCUMENTS

| | | |
|---|---|---|
| 6,958,912 B2 | 10/2005 | Pokharna et al. |
| 7,044,199 B2 | 5/2006 | Thayer et al. |
| 7,275,720 B2 | 10/2007 | Behrens et al. |
| 7,501,111 B2 | 3/2009 | Keller et al. |
| 7,710,722 B2 | 5/2010 | Suzuki et al. |
| 2001/0045270 A1 | 11/2001 | Bhatti et al. |
| 2003/0230401 A1 | 12/2003 | Pfister et al. |
| 2004/0027806 A1 | 2/2004 | Lin |
| 2004/0104022 A1 | 6/2004 | Kenny et al. |
| 2004/0132607 A1 | 7/2004 | Wood et al. |
| 2004/0182548 A1 | 9/2004 | Lovette et al. |
| 2004/0245373 A1 | 12/2004 | Behrens et al. |
| 2004/0245389 A1 | 12/2004 | Behrens et al. |
| 2005/0082037 A1 | 4/2005 | Thayer et al. |
| 2005/0084665 A1 | 4/2005 | DiChiara, Jr. |
| 2005/0111188 A1 | 5/2005 | Bhattacharya et al. |
| 2005/0111966 A1 | 5/2005 | Metheny |
| 2005/0269061 A1 | 12/2005 | Brewer et al. |
| 2006/0011336 A1 | 1/2006 | Frul |
| 2006/0068205 A1 | 3/2006 | Potier |
| 2006/0141413 A1 | 6/2006 | Masten et al. |
| 2006/0151147 A1* | 7/2006 | Symonds ............ 165/11.1 |
| 2006/0157225 A1 | 7/2006 | Martin et al. |
| 2007/0095507 A1 | 5/2007 | Henderson et al. |
| 2007/0246191 A1 | 10/2007 | Behrens et al. |
| 2007/0247808 A1 | 10/2007 | Behrens et al. |
| 2007/0247812 A1 | 10/2007 | Behrens et al. |
| 2007/0292654 A1 | 12/2007 | Bohner et al. |
| 2008/0105402 A1 | 5/2008 | Behrens et al. |
| 2008/0131653 A1 | 6/2008 | Lyons et al. |
| 2008/0196869 A1 | 8/2008 | Behrens et al. |
| 2010/0038051 A1 | 2/2010 | Behrens et al. |

FOREIGN PATENT DOCUMENTS

| | | |
|---|---|---|
| EP | 2124009 A2 | 11/2009 |
| GB | 2437383 A | 10/2007 |
| WO | WO 99-52838 | 10/1999 |
| WO | WO 99-66279 | 12/1999 |
| WO | WO 2004-108531 | 12/2004 |

OTHER PUBLICATIONS

Extended European Search Report for Application No. 10193280.4-1602/2333475 dated Mar. 28, 2013; 8 pages.

"rarefaction", definition from Oxford English Dictionary Online, Oxford University Press, 2009, 3 pages.

"rarefied", definition from Oxford English Dictionary Online, Oxford University Press, 2009, 2 pages.

Examination Report under Section 18(3) for Application No: GB0706419.9, dated Jun. 9, 2008, 4 pages.

Kim et al., "Thermal Performance of Aluminum-Foam Heat Sinks by Forced Air Cooling", IEEE Transactions of Components and Packaging Technologies, vol. 26, No. 1, Mar. 2003, pp. 262-267.

\* cited by examiner

EXTENDED PLUG COLD PLATE

FIELD OF THE DISCLOSURE

The present disclosure is generally related to heat exchange devices, systems and methods.

BACKGROUND

Heat exchange devices, such as cooling plates, are used to reduce thermal loads or to manage thermal loads for a variety of applications. For example, aircraft, spacecraft, automobiles and other land-based vehicles, and ships and other water-based vehicles may use heat exchange devices to manage thermal loads. The thermal loads may be caused by onboard equipment, the environment, other sources, or a combination of sources. To illustrate, aircraft may use cooling plates to manage heat loads associated with avionics and printed circuit boards, aircraft engines, and so forth. Additionally, aircraft may use cooling plates for thermal protection systems to preserve underlying air frame structure from exposure to disruptive heat fluxes generated due to fluid resistance (e.g., air friction) or by portions of the air frame being subjected to high temperature exhaust. In another illustrative example, tanks or other land-based vehicles may use heat exchange devices to manage thermal loads from environmental exposure, engines, or other heat sources.

Managing thermal loads can be expensive in terms of equipment cost, operational costs, weight, space constraints, and so forth. Equipment cost, operational cost, weight, and space constraints are generally of concern whether a heat exchange device is intended for use in an aircraft, a land-based craft, a water-based craft, a spacecraft or even a fixed structure, such as a building. For example, certain heat exchange devices may be associated with relatively high equipment costs. For example, heat exchange devices that use brazed aluminum foam and metal fins may have high manufacturing costs due to manufacturing difficulties (such as high temperature soldering) associated with these devices. Accordingly, the equipment costs of such devices may be relatively high.

In an example illustrating operational costs, heat exchange devices can be an operational penalty when used in a vehicle due to increased weight of the vehicle to provide for plenums to route coolant and other equipment associated with the heat exchange devices, such as equipment used to pressurize the coolant. The vehicle may also incur other operational penalties. To illustrate, certain aircraft may use ram air as a coolant. When ram air is used as the coolant, the ram air may be diverted from the aircraft's engines. Diverting air from an aircraft engine for use as ram air coolant can reduce operational efficiency of the aircraft engine resulting in higher operational costs and/or less than optimal performance. Generally, the more air that is diverted, the greater the operational cost that is added to the aircraft. Other vehicles may also incur operational costs due to heat exchange devices.

Particular vehicles may use heat exchange devices for thermal protection systems to provide structural cooling of the vehicle. Examples of thermal protection systems include back side cooling systems, film cooling systems and transpiration cooling systems. Back side cooling systems blow coolant through a duct on the back side of the structure to be cooled, away from a side experiencing heat flux. Film cooling systems blow coolant from a plenum on the back side of the structure through closely spaced holes in the structure itself. The coolant may form a film on the side of the structure being heated that protects the structure and controls the interface temperature. Transpiration cooling systems intimately cool a porous structure by flowing cooling air directly through the porous structure from a back side plenum.

Back side cooling systems, film cooling systems and transpiration cooling systems may use relatively high coolant flow rates to achieve the desired cooling. Further, each of these systems may use heavy, expensive structural ducting and plenum systems to deliver coolant to an area to be cooled. For example, a plenum may be provided directly behind each area needing cooling. Further, film cooling systems may be expensive due to the cost of providing a large number of small holes in the surface to be cooled. Transpiration systems may be limited by ceramic and sintered metal porous materials used for the surface to be cooled.

SUMMARY

Heat exchange systems, devices and methods are disclosed. A particular heat exchange device includes a housing defining an inlet and an outlet. The heat exchange device also includes at least one ceramic foam member inside the housing. The at least one ceramic foam member has a plurality of pores therein. The heat exchange device also includes a plurality of extended plugs that extend from a first side of the housing through the ceramic foam member to a second side of the housing. The first side of the housing is spaced apart from the at least one ceramic foam member by first ends of the plurality of extended plugs.

In a particular embodiment, a method includes extracting heat from a surface to be cooled by routing a coolant to an inlet of a heat exchange device adjacent to the surface to be cooled. The heat exchange device includes an inlet and an outlet. The heat exchange device also includes a ceramic foam member spaced apart from the surface to be cooled. The ceramic foam member defines a plurality of pores. The heat exchange device also includes a plurality of extended plugs that extend from a first side of the ceramic foam member adjacent to the inlet through the ceramic foam member to the surface to be cooled. The coolant routed to the inlet passes to a space between the ceramic foam member and the surface to be cooled through the pores of the ceramic foam member. The coolant further flows through the space to an outlet of the heat exchange device.

In a particular embodiment, a system includes an aircraft that includes a heat-exposed surface and a cooling plate adjacent to the heat-exposed surface. The cooling plate includes an inlet and an outlet. The cooling plate also includes at least one ceramic foam member inside the cooling plate. The at least one ceramic foam member defines a plurality of pores. The cooling plate also includes a plurality of extended plugs that extend from a first side of the cooling plate separated from the heat-exposed surface through the ceramic foam member to a second side of the cooling plate adjacent to the heat-exposed surface. The second side of the heat-exposed surface is spaced apart from the at least one ceramic foam member by first ends of the plurality of extended plugs.

In a particular embodiment, a method includes applying a first casting layer to a first side of a ceramic foam member and applying a second casting layer to a second side of the ceramic foam member. The method also includes forming a plurality of openings through the first casting layer, the ceramic foam member and the second casting layer. The method further includes inserting a casting material into the plurality of openings and curing the casting material to form a plurality of extended plugs through the ceramic foam member. The method also includes removing the first and second casting layers from the ceramic foam member.

The features, functions, and advantages that have been described can be achieved independently in various embodiments or may be combined in yet other embodiments, further details of which are disclosed with reference to the following description and drawings.

DETAILED DESCRIPTION

Figure 1:
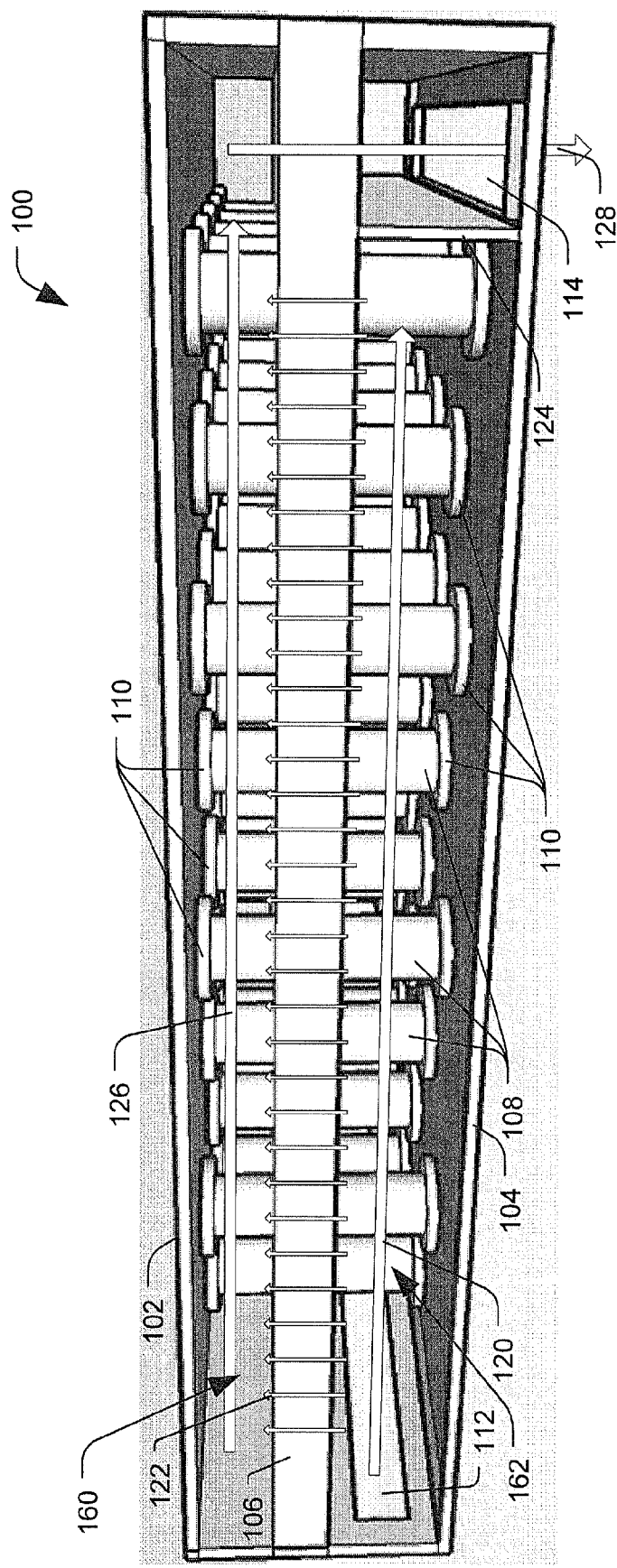
FIG. 1 is a diagram of a first particular embodiment of a heat exchange device.

Heat exchange devices are disclosed that transfer heat in an extremely efficient manner with minimal coolant pressure drop from a high flux source. The heat exchange devices use high thermal conductivity extended plugs to transfer the heat into a high internal surface area ceramic foam. The extended plugs are thermally conductive members that project or extend from two sides of the ceramic foam. The ceramic foam conveys the heat, via convection, to a coolant that travels through the ceramic foam from an inlet side to an outlet side. The coolant also directly wets portions of the extended plugs further increasing heat transfer efficiency. Since the extended plugs extend through the ceramic foam, the heat exchange device may be referred to as an extended plug heat exchanger, or alternatively as an extended plug cold plate.

The heat exchange devices disclosed herein provide improved heat exchange at lower coolant flow rates. The heat exchange devices may be used for avionics cold plate cooling and thermal protection systems for heat exposed surfaces. The heat exchange devices may be manufactured using relatively simple and low cost processes and materials. In particular, the heat exchange devices may be manufactured less expensively than certain other heat exchange devices that use brazed aluminum foam and metal fins. Additionally, cost savings may be achieved by using the heat exchange devices since a reduction in structural plenums and cast or sintered high temperature parts may be achieved. Thus, the heat exchange devices may provide a low cost, thermally efficient system for cooling high heat dissipation electronics. The heat exchange devices have a low air vehicle system penalty because they requires less coolant to absorb a given amount of heat at a given coolant pressure drop as compared to metal foam cold plates. The heat exchange devices provide more efficient cooling of avionics than certain backside convection systems that may be employed. For example, less coolant flow may be required for a given heat load. The ceramic foam core of the disclosed heat exchange devices may act as a cooling air plenum. Accordingly, the heat exchange devices are capable of controlling hot side interface temperature without the use of heavy coolant supply plenums. Further, the high efficiency of the disclosed heat exchange devices means that underlining structure under the heat exchange devices can be constructed of low temperature materials, further reducing cost and weight of the vehicle. It is estimated that for certain aircraft, eliminating heavy coolant plenums and utilizing light weight low temperature materials, such as polymer composite structures, may reduce structural weight of the aircraft by more than 50%.

The heat exchange devices, systems, and methods disclosed in various embodiments transfer heat in an efficient manner with reduced coolant pressure drop from a high flux source by using high thermal conductivity of the extended plugs to transfer energy into a high internal surface area ceramic foam sheet. The ceramic foam sheet conveys the energy via convection to a coolant that travels through the ceramic foam sheet from an inlet side to an exit side, while also directly wetting the extended plugs.

Various embodiments may be useful for thermal management in aerospace applications. For example, the heat exchange devices may be used as cold plates for cooling high power printed circuit boards (PCBs) or for more efficient cooling of PCBs. In another example, the heat exchange devices may be used as a thermal protection system (TPS) for preserving underlying airframe structure from damage by high heat fluxes generated on the vehicle outside mold line and propulsion flow path during high speed flight. For cold plate and TPS, an interface between the heat exchange device and the incident heat flux may have a limiting temperature. This limiting temperature may be a maximum tolerable junction temperature. For example, in the case of avionics PCBs, the limiting temperature may be in the range of 160° F. to 180° F. In a TPS, the limiting temperature for the material of the TPS may be about 2500° F. In both situations, the required coolant flow rate should be reduced as much as possible because this constitutes a performance penalty to an air vehicle.

Avionics cooling on aircraft may be provided by blowing cooled, conditioned air over a back side of the PCB away from chips. The cooling air may be provided by an Environmental Control System (ECS) on the aircraft. Coolant passages may have extended surfaces such as metal plate fins built into them to provide enhanced heat transfer. Large pore metal foam cold plates may also be employed for avionics cooling.

Thermal protection systems for high speed flight may use back side structural cooling, film cooling, or transpiration cooling. Back side cooling involves blowing coolant through a duct on the back side of the structure to be cooled, away from the side experiencing heat flux. Film cooling involves blowing coolant from a plenum on the back side of the structure through closely spaced holes in the structure itself. The coolant then forms a film on the side of the structure being heated that protects the structure and controls the interface temperature. Transpiration cooling intimately cools porous structure by flowing cooling air directly through it from a back side plenum.

Back side cooling, film cooling and transpiration cooling systems have significant disadvantages as compared to the disclosed heat exchange devices. For example, each may use high coolant flow rates to achieve the same cooling. Further, each may use heavy, expensive structural ducting and plenum systems to deliver coolant to the area to be cooled. A plenum may be provided directly behind each area needing cooling. A further drawback of the film cooling system may be the expense associated with drilling large numbers of small holes in the surface to be cooled. Film cooling may also be hard to control because free stream flow over the heated surface scrubs away the cooling film. Transpiration systems may be limited by ceramic and sintered metal porous materials used for the surface to be cooled. Ceramics can be brittle and may lack structural strength when unsupported by a substrate. Sintered metals may be heavy and expensive.

The combination of extended plugs and a hyperporous, high internal surface area ceramic foam formed into a heat exchange device may provide a much larger convective surface area than is available for back side cooled plate fin avionics cold plates. The configuration and coolant flow path found in the disclosed heat exchange devices are unlike those found in conventional high speed flight TPS configurations. For example, the disclosed heat exchange devices do not require a heavy, expensive structural plenum to supply coolant. Additionally, more even cooling of the interface may be achieved than may be achieved using film cooling. This is because the coolant may be contained inside the heat exchange device instead of blown into the free stream.

Increased efficiency means that either higher heat flux PCBs can be controlled to a specified junction temperature or that less coolant is needed to meet a specified junction temperature for a conventional PCB. When the coolant is ram air, using less coolant may reduce the thrust penalty derived from the ECS since less ram air may be diverted from the engines for use as coolant. Additionally, as compared to a conventional TPS, the heat exchange devices disclosed herein may be more lightweight and cost less to construct, yet may still provide the same degree of thermal protection with less coolant.

FIG. 1 is a diagram of a first particular embodiment of a heat exchange device, generally referenced 100. The heat exchange device 100 includes a housing (only partially shown) including a first side 102 and a second side 104. The housing also includes an inlet 112 and an outlet 114. One or more ceramic foam members 106 are disposed within the housing (e.g., between the first side 102 and the second side 104). The one or more ceramic foam members 106 define a plurality of pores through which a coolant 120 can pass. For example, the one or more ceramic foam members 106 may include a plurality of irregularly oriented ceramic fibers with openings between them through which the coolant 120 can flow providing a large surface area for thermal transfer. For example, the one or more ceramic foam members 106 may include one or more of the ceramic foams described with reference to FIG. 3.

The heat exchange device 100 may also include a plurality of extended plugs 108 that extend from the first side 102 of the housing to the second side 104 of the housing through the one or more ceramic foam members 106. In a particular embodiment, the first side 102 of the housing is spaced apart from the one or more ceramic foam members 106 by a first end of the plurality of extended plugs 108. In this embodiment, the one or more ceramic foam members 106 and the first side 102 of the housing define a first channel 160 through which the coolant 120 passes in contact with the one or more extended plugs 108. Additionally, the second side 104 of the housing may be spaced apart from the one or more ceramic foam members 106 by second ends of the plurality of extended plugs 108. Accordingly, the second side 104 of the housing and the one or more ceramic foam members 106 may define a second channel 162 through which the coolant 120 flows in contact with the plurality of extended plugs 108. In a particular embodiment, the one or more ceramic foam members 106 and the plurality of extended plugs 108 together may be referred to as a heat exchanger core or as a cold plate.

In certain embodiments, one or more sides of the housing may be thermally conductive to facilitate transfer of heat from outside the housing to the coolant 120. For example, the first side 102 of the housing may be thermally conductive to receive heat from a heat source (not shown) and to transfer the heat to the plurality of extended plugs 108. In a particular embodiment, one or more sides of the housing may be thermally insulating to reduce transfer of heat from the coolant 120 to outside the housing. For example, when the heat exchange device 100 is used for a thermal protection system to protect an underlying structure from exposure to heat, the second side 104 of the housing may be thermally insulating to reduce heat transfer from the coolant 120 to the underlying structure. In this embodiment, the second side 104 may be formed of a ceramic foam. For example the second side 104 may be formed of the same material as the one or more ceramic foam members 106.

In a particular embodiment, one or more sides of the housing may be erosion resistant. To illustrate, when the heat exchange device 100 is used as a thermal protection system to protect an underlying composite structure (e.g., fiberglass reinforced plastic) of an aircraft, the first side 102 may include an erosion resistant layer to enable the heat exchange device 100 to operate in harsh exterior environment of the aircraft. For example, the first side 102 of the housing may include a plurality of alumina silica fibers embedded with an aluminum nitride material to form a thermally conductive, erosion resistant layer. The thermally conductive, erosion resistant layer may be formed by impregnating an alumina-silica cloth, sheet or mat (such as Nitivy ALF™ fibers available from Nitivy Company Limited of Tokyo, Japan) with a castable aluminum nitride material (such as Aremco Cerama-cast™ 675N ("Ceramacast 675N"), available from Aremco Products, Inc. of Valley Cottage, N.Y.) and curing the castable aluminum nitride material.

In a particular embodiment, the plurality of extended plugs 108 have a low electrical conductivity. For example, the plurality of extended plugs 108 may include aluminum nitride rods that extend from the first side 102 of the housing to the second side 104 of the housing through the one or more ceramic foam members 106. Other materials with thermal and electrical conductivity properties similar to aluminum nitride may also be used. As described further with reference to FIGS. 4-10, the plurality of extended plugs 108 may be formed using a castable aluminum nitride material.

In a particular embodiment, the extended plugs 108 are coupled to the first side 102 and to the second side 104 of the housing via a thermally conductive adhesive 110. For example, the thermally conductive adhesive 110 may include a room temperature vulcanizing (RTV) adhesive. In another example, the first side 102 and the second side 104 of the housing may be bonded to the extended plugs 108 using the castable aluminum nitride material.

The heat exchange device 100 may also include a coolant impermeable dam 124 on an inlet side of the heat exchange device 100. The inlet side of the heat exchange device may refer to a side of the heat exchange device 100 including the second channel 162. The coolant impermeable dam 124 may prevent the coolant 120 received via the inlet 112 from flowing directly to the outlet 114, forcing the coolant 120 to flow through the one or more ceramic foam members 106 to the first channel 160. In FIG. 1, the inlet 112 is illustrated as located on an end of the heat exchange device (i.e., a plane of the inlet 112 is transverse to a plane of the second side 104 of the housing). However, in other embodiments, the inlet 112 may be located in another position, such as through the second side 104 of the housing (i.e., such that a plane of the inlet 112 is parallel with a plane of the second side 104). Additionally, the outlet 114 in FIG. 1 is illustrated as located on the second side 104 of the housing (i.e., a plane of the outlet 114 is parallel to a plane of the second side 104 of the housing). However, in other embodiments, the outlet 114 may be located in another position, such as through an end of the housing (i.e., such that a plane of the outlet 114 is perpendicular to a plane of the second side 104).

In operation, the coolant 120 may be received via the inlet 112 into the second channel 162 of the heat exchange device 100. Since the coolant impermeable dam 124 inhibits the coolant 120 from flowing from the inlet 112 directly to the outlet 114, a pressure differential between the second channel 162 and the first channel 160 may drive the coolant 120 to flow through a thickness of the one or more ceramic foam members 106, as illustrated by coolant flow 122 to the first channel 160. The coolant 120 may flow into the first channel 160, as illustrated by coolant flow 126 and to the outlet 114 as illustrated by coolant flow 128.

In various embodiments, the coolant 120 may include ram air. The coolant 120 may be processed before being routed to the heat exchange device 100. For example, a temperature or pressure of the coolant 120 may be modified before the coolant 120 is routed to the heat exchange device 100.

In a particular embodiment, heat received via the first side 102 of the housing may be transferred to the plurality of extended plugs 108 via the thermally conductive adhesive 110. The coolant 120 received at the inlet 112 may flow in contact with the plurality of extended plugs 108 in the second channel 162. The coolant 120 may pass through pores of the one or more ceramic foam members 106 (as shown at the coolant flow 122). The coolant 120 may also flow in contact with the plurality of extended plugs 108 in the first channel 160 to the outlet 114 (as shown at the coolant flows 126 and 128). Heat may be transferred to the coolant 120 by the plurality of extended plugs 108; by contact with sides of the housing 102, 104; and by contact with the one or more ceramic foam members 106. Accordingly, a high rate of heat transfer and a greatly reduced surface temperature at first side 102 may be achieved at a relatively low coolant pressure drop. Thus, thermal protection and surface temperature control in the presence of a high flux heat source may be achieved by using a plurality of extended plugs 108 to transfer heat to the one or more ceramic foam members 106 so that the coolant 120 may contact the relatively high surface area of the ceramic foam member 106 to extract the heat.

In a particular embodiment, a heat source (not shown) may be on the first side 102 of the housing. For example, the heat source may include a printed circuit board or other electronic device, such as an avionics component. In another example, the heat source may include an exterior surface of an aircraft, such as a leading edge or other surface subjected to a high heat load or a surface on a propulsion flow path (such as an engine exhaust nozzle). Additionally, since the coolant 120 flows from the inlet 112 to the outlet 114 through the channels 160 and 162, a reduction in the overall volume and in the weight of the materials required for plenums may be achieved since the channels 160 and 162 provide routing of the coolant where plenums would otherwise be used (e.g., for back side cooling systems or film cooling systems).

Figure 2:
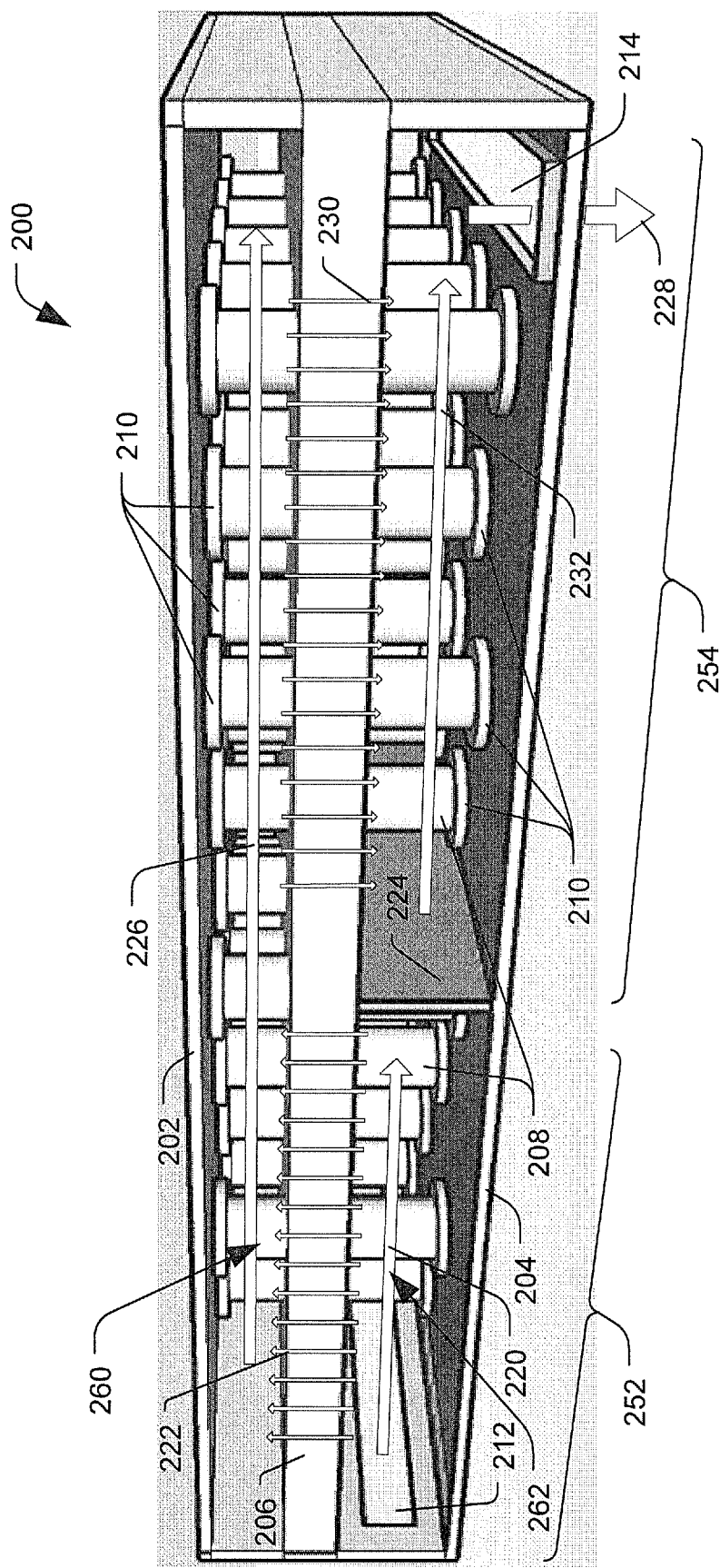
FIG. 2 is a diagram of a second particular embodiment of a heat exchange device.

FIG. 2 is a diagram of a second particular embodiment of a heat exchange device, generally referenced 200. The heat exchange device 200 includes a housing (only partially shown) including a first side 202 and a second side 204. The housing also includes an inlet 212 and an outlet 214. One or more ceramic foam members 206 are disposed within the housing (e.g., between the first side 202 and the second side 204). The one or more ceramic foam members 206 define a plurality of pores through which a coolant 220 can pass. For example, the ceramic foam member(s) 206 may include a plurality of irregularly oriented ceramic fibers with openings between them through which the coolant 220 can flow providing a large surface area for thermal transfer. In a particular embodiment, the ceramic foam member(s) 206 include one or more of the ceramic foams describe with reference to FIG. 3.

The heat exchange device 200 may also include a plurality of extended plugs 208 that extend from the first side 202 of the housing to the second side 204 of the housing through the one or more ceramic foam members 206. In a particular embodiment, the first side 202 of the housing is spaced apart from the one or more ceramic foam members 206 by a first end of the plurality of extended plugs 208. In this embodiment, the one or more ceramic foam members 206 and the first side 202 of the housing define a first channel 260 through which the coolant 220 passes in contact with the one or more extended plugs 208. Additionally, the second side 204 of the housing may be spaced apart from the one or more ceramic foam members 206 by second ends of the plurality of extended plugs 208. Accordingly, the second side 204 of the housing and the one or more ceramic foam members 206 may define a second channel 262 through which the coolant 220 flows in contact with the plurality of extended plugs 208.

In certain embodiments, one or more sides of the housing are thermally conductive to facilitate transfer of heat from a heat source outside the housing to the coolant 220. For example, the first side 202 of the housing may be thermally conductive to receive heat from the heat source and to transfer the heat to the plurality of extended plugs 208. In a particular embodiment, one or more sides of the housing are thermally insulating to reduce transfer of heat from the coolant 220 to outside the housing. For example, when the heat exchange device 200 is used for a thermal protection system to protect an underlying structure from exposure to heat, the second side 204 of the housing may be thermally insulating to reduce heat transfer from the coolant 220 to the underlying structure. In this embodiment, the second side 204 may be formed of a ceramic foam. For example the second side 204 may be formed of the same material as the one or more ceramic foam members 206.

In a particular embodiment, one or more sides of the housing may be erosion resistant. To illustrate, when the heat exchange device 200 is used as a thermal protection system to protect an underlying composite structure (e.g., fiberglass reinforced plastic) of an aircraft, the first side 202 may include an erosion resistant layer to enable the heat exchange device 200 to operate in a harsh exterior environment of the aircraft. For example, the first side 202 of the housing may include a plurality of alumina silica fibers embedded with an aluminum nitride material to form thermally conductive, erosion resistant layer. The thermally conductive, erosion resistant layer may be formed by embedding alumina-silica fibers, cloth, sheet or mat (such as Nitivy ALF™ fibers available from Nitivy Company Limited of Tokyo, Japan) with a castable aluminum nitride material (such as Ceramacast 675N) and curing the castable aluminum nitride material.

In a particular embodiment, the plurality of extended plugs 208 have a low electrical conductivity. For example, the plurality of extended plugs 208 may include aluminum nitride rods that extend from the first side 202 of the housing to the second side 204 of the housing through the one or more ceramic foam members 206. Other materials with thermal and electrical conductivity properties similar to aluminum nitride may also be used. As described further with reference to FIGS. 4-10, the plurality of extended plugs 208 may be formed using a castable aluminum nitride material.

In a particular embodiment, the plurality of extended plugs 208 is coupled to the first side 202 and to the second side 204 of the housing via a thermally conductive adhesive 210. For example, the thermally conductive adhesive 210 may include a room temperature vulcanizing (RTV) adhesive. In another example, the first side 202 and the second side 204 of the housing may be bonded to the extended plugs 208 using the castable aluminum nitride material.

The heat exchange device 200 may also include a coolant impermeable dam 224 in the second channel 262 between an inlet side 252 of the heat exchange device 200 and an outlet side 254 of the heat exchange device 200. The inlet side 252 of the heat exchange device 200 may refer to a side of the heat exchange device 200 including the inlet 212 and a first portion of the second channel 262. The outlet side 254 of the heat exchange device 200 may refer to a side of the heat exchange device 200 including the outlet 214 and a second portion of the second channel 262. In the embodiment illustrated in FIG. 2, the inlet side 252 of the heat exchange device 200 includes the portion of the second channel 262 including an area between the inlet 212, the one or more ceramic foam members 206, the second side 204 of the housing, and the coolant impermeable dam 224. The outlet side 254 of the heat exchange device 200 includes the portion of the second channel 262 including an area between the outlet 214, the one or more ceramic foam members 206, the second side 204 of the housing, and the coolant impermeable dam 224. The coolant impermeable dam 224 may force the coolant 220 received via the inlet 212 to flow through the one or more ceramic foam members 206 in a first direction (toward the first side 202 of the housing) and to flow through the one or more ceramic foam members 206 in a second direction (toward the second side 204 of the housing) to the outlet 214. Since the coolant 220 passes through pores of the one or more ceramic foam members 206 twice, the embodiment illustrated in FIG. 2 may be referred to as a two pass configuration of the heat exchange device 200. Increased thermal efficiency may be achieved by the two pass configuration as compared to single pass configurations where the coolant 220 only passes through the pores of the one or more ceramic foam members 206 once.

In FIG. 2, the inlet 212 is illustrated as located on an end of the heat exchange device 200 (i.e., a plane of the inlet 212 is perpendicular to a plane of the second side 204 of the housing). However, in other embodiments, the inlet 212 is located in another position, such as through the second side 204 of the housing (i.e., such that the plane of the inlet 212 is parallel with the plane of the second side 204). Additionally, the outlet 214 in FIG. 2 is illustrated as located on the second side 204 of the housing (i.e., a plane of the outlet 214 is parallel to the plane of the second side 204 of the housing). However, in other embodiments, the outlet 214 may be located in another position, such as through an end of the housing (i.e., such that the plane of the outlet 214 is perpendicular to the plane of the second side 204).

In operation, the coolant 220 may be received via the inlet 212 into the second channel 262. Since the coolant impermeable dam 224 inhibits the coolant 220 from flowing from the inlet 212 directly to the outlet 214, a pressure differential between the second channel 262 and the first channel 260 may force the coolant 220 to flow through a thickness of the one or more ceramic foam members 206, as illustrated by coolant flow 222. The coolant 220 may flow in the first channel 260 as illustrated by coolant flow 226. A pressure differential between the first channel 260 and the outlet side 254 of the second channel 262 may force the coolant 220 to flow through the thickness of the one or more ceramic foam members 206 in a second direction, as illustrated by coolant flow 230, to the outlet side 254. The coolant 220 may flow within the outlet side 254 to the outlet 214 and exit the heat exchange device 200 via the outlet 214, as illustrated by coolant flow 228.

In a particular embodiment, the coolant 220 includes ram air. In other embodiments, the coolant 220 may include another cooling fluid, either liquid or gas. The coolant 220 may be processed before being routed to the heat exchange device 200. For example, a temperature or pressure of the coolant 220 may be modified before the coolant 220 is routed to the heat exchange device 200.

In a particular embodiment, heat received via the first side 202 of the housing is transferred to the plurality of extended plugs 208 via the thermally conductive adhesive 210. The coolant 220 received at the inlet 212 may flow in contact with the plurality of extended plugs 208 on the inlet side 252 of the second channel 262. The coolant 220 may pass through the pores of the one or more ceramic foam members 206 in the first direction as shown by the coolant flow 222. The coolant 220 may also flow in contact with the plurality of extended plugs 208 in the first channel 260 as shown by the coolant flow 226. The coolant 220 may pass through the pores of the one or more ceramic foam members 206 in the second direction as shown by the coolant flow 230. The coolant may flow in contact with the plurality of extended plugs 208 as shown by the coolant flow 232 and out of the heat exchange device 200 via the outlet 214 as shown by the coolant flow 228. Heat may be transferred to the coolant 220 by the plurality of extended plugs 208; by contact with sides of the housing 202, 204; and by contact with the one or more ceramic foam members 206 as the coolant 220 flows through pores of the one or more ceramic foam members 206 in both directions. Accordingly, a high rate of heat transfer and a greatly reduced surface temperature at the first side 202 may be achieved at a relatively low coolant pressure drop. Thus, thermal protection and surface temperature control in the presence of a high flux heat source may be achieved by using a plurality of extended plugs 208 to transfer heat to the one or more ceramic foam members 206 so that the coolant 220 may contact the relatively high surface area of the ceramic foam member 206 to absorb heat.

In a particular embodiment, a heat source (not shown) may be on the first side 202 of the housing. For example, the heat source may include a printed circuit board or other electronic device, such as an avionics component. In another example, the heat source may include an exterior surface of an aircraft, such as a leading edge or other surface subjected to a high heat load or a surface in a propulsion flow path, such as an engine exhaust nozzle. Additionally, since the coolant 220 flows from the inlet 212 to the outlet 214 through the channels 260 and 262, a reduction in the overall volume and in the weight of the materials required for plenums may be achieved.

Figure 3:
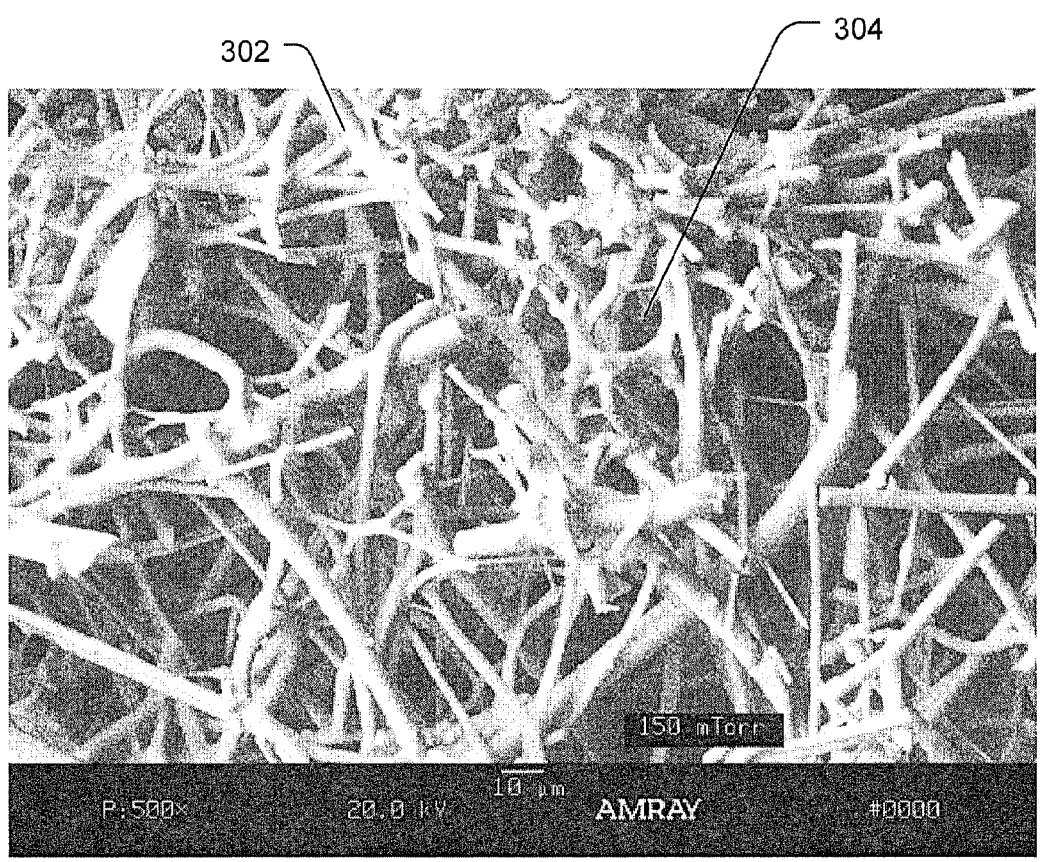
FIG. 3 is an illustration of a particular embodiment of a ceramic foam core for a heat exchange device.

FIG. 3 is an illustration of a particular embodiment of a ceramic foam for a heat exchange device. The ceramic foam illustrated in FIG. 3 may be used to form a ceramic foam member, such as the one or more ceramic foam members 106 of FIG. 1 or the one or more ceramic foam members 206 of FIG. 2. In particular, FIG. 3 illustrates an electron micrograph of fibers 302 of Alumina Enhanced Thermal Barrier (AETB), made by The Boeing Company, Huntington Beach, Calif. FIG. 3 also illustrates that pores 304 of the ceramic foam may have an average pore size of approximately 35 micrometers. Another ceramic foam material that may be used is Boeing Rigid Insulation foam (BRI) also available from The Boeing Company, Huntington Beach, Calif.

The ceramic foam may include materials that combine small average pore size and high porosity. In one exemplary, non-limiting embodiment, the ceramic foam includes an alumina silica ceramic foam with up to around 68 percent silica, around 20 percent alumina, and around 12 percent alumina borosilicate fibers. The ceramic foam may include an alumina silica foam that is light-weight having a density of approximately 16 pounds per cubic foot. The porosity of the ceramic foam may be in excess of 80 percent. In a particular embodiment, the porosity may be at least 90 percent. The pores of the ceramic foam may be between 5 and 50 microns across with an average pore size of about 35 microns. The combination of high porosity and very small pores provides a large internal surface area for transfer of heat to a coolant flowing through the pores of the ceramic foam. For example, the internal surface area of the ceramic foam may be approximately 31,350 $ft^2/ft^3$.

In a particular embodiment, the pores of the ceramic foam have an average diameter of less than 50 microns, so air flow through the ceramic foam becomes rarefied. Air flow in ceramic foam at the pressure levels characteristic of the embodiments disclosed herein results in the flow being in the slip flow regime. Rarefaction of the coolant flow (i.e., flow within the slip flow regime) occurs when the flow channel size, in this case the effective diameter of the pores, approaches the mean free path of the individual molecules in the coolant flow. In rarefied flow, the flow can no longer be considered as a continuum and is more correctly considered in terms of the path of individual particles through the flow channel. Since no boundary layer is formed, the coolant has a non-zero "slip" velocity at the walls of the flow channels. Testing has shown that rarefied flow in the pores (e.g., flow with a non-zero slip velocity at walls of the flow channel) leads to a reduced pressure drop for the flow, compared to what would be expected for continuum flow where a no-slip boundary layer is formed. Thus, the small pores found in the ceramic foam may cause rarefaction of the flow through the ceramic foam which may reduce the pressure drop of the coolant flowing through the ceramic foam, compared to what would be expected for continuum flow. Testing has shown that slip flow produced by rarefaction in BRI may reduce the pressure drop by 20 percent to 50 percent compared to what may be predicted under the continuum flow assumption.

Figure 4:
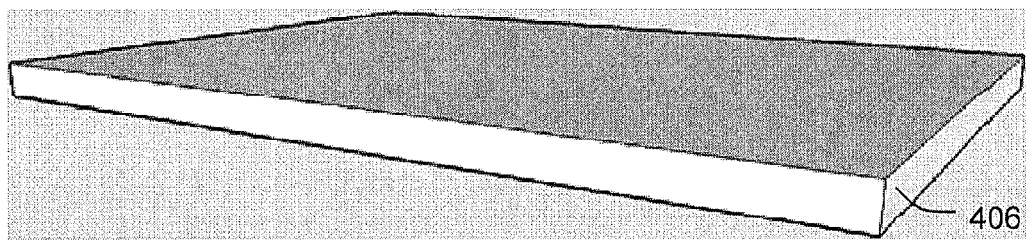
FIGS. 4-9 illustrate a particular embodiment of a method of manufacturing a heat exchange core.
Figure 5:
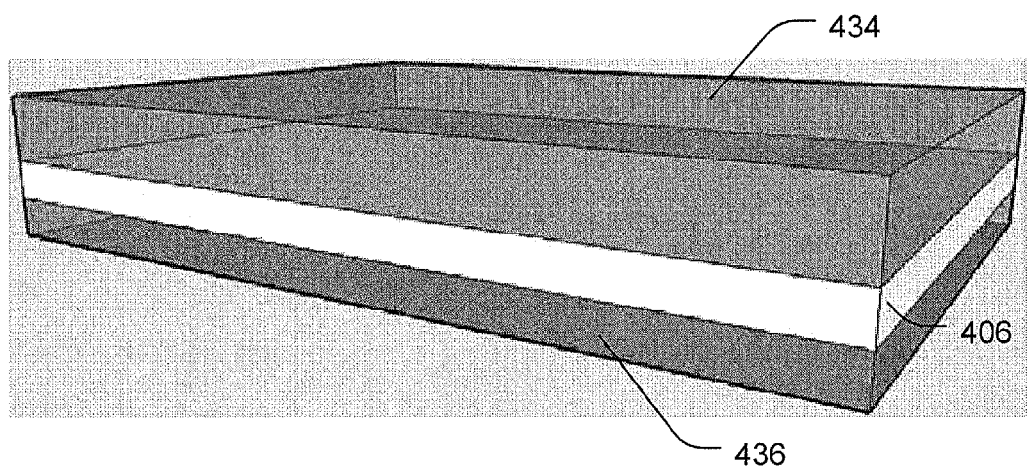

FIGS. 4-9 illustrate a particular embodiment of a method of manufacturing an extended plug cold plate. For example, the method illustrated in FIGS. 4-9 may be used to manufacture the heat exchange device 100 illustrated in FIG. 1 or the heat exchange device 200 illustrated in FIG. 2. Referring to FIG. 4, a ceramic foam member 406 is provided. The ceramic foam member 406, such as the ceramic foam illustrated in FIG. 3, may include a plurality of pores defined by spaces between ceramic fibers. Referring to FIG. 5, a first casting layer 434 is applied to a first side of the ceramic foam member 406 and a second casting layer 436 is applied to a second side of the ceramic foam member 406. The first casting layer 434 and the second casting layer 436 may include a wax layer, a silicone layer, or a layer of another material that can be applied to and removed from the ceramic foam member 406 without damaging extended plugs (such as the extended plugs 108 of FIG. 1 or the extended plugs 208 of FIG. 2) formed through the ceramic foam member 406. The casting layers 434 and 436 should also be capable of being modified to provide openings for casting the extended plugs.

Figure 6:
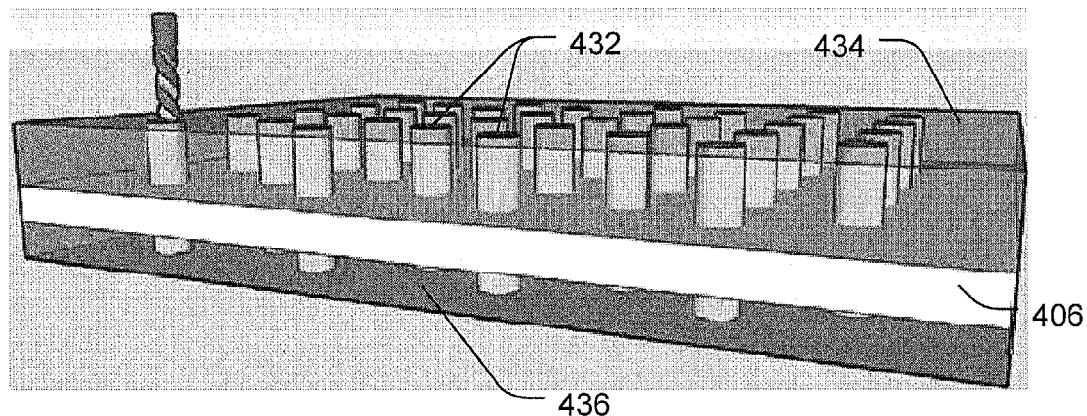

Referring to FIG. 6, a plurality of openings 432 are provided through the first casting layer 434, the ceramic foam member 406, and the second casting layer 436. For example, the openings 432 may be drilled or otherwise machined through the first casting layer 434, the ceramic foam member 406, and the second casting layer 436.

Figure 7:
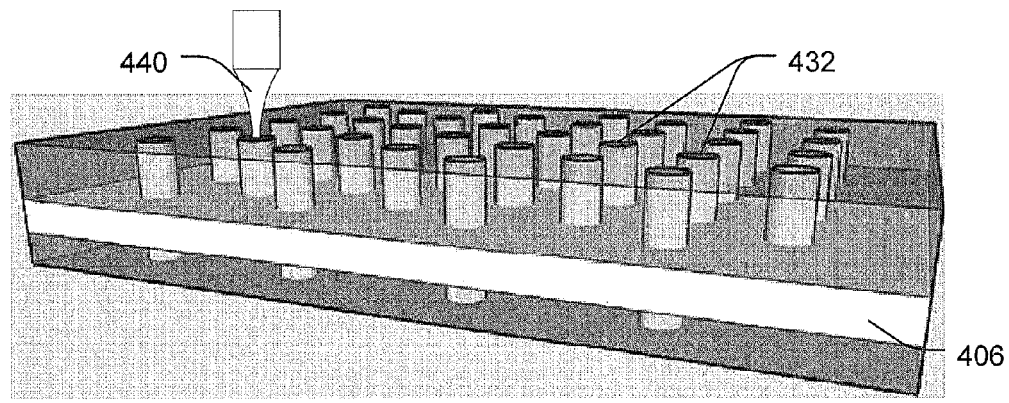

Referring to FIG. 7, a casting material 440 may be pored or injected into the openings 432. The casting material 440 may be curable to form a thermally conductive material. For example, the casting material 440 may include a castable aluminum nitride, such as Ceramacast 675N.

Figure 8:
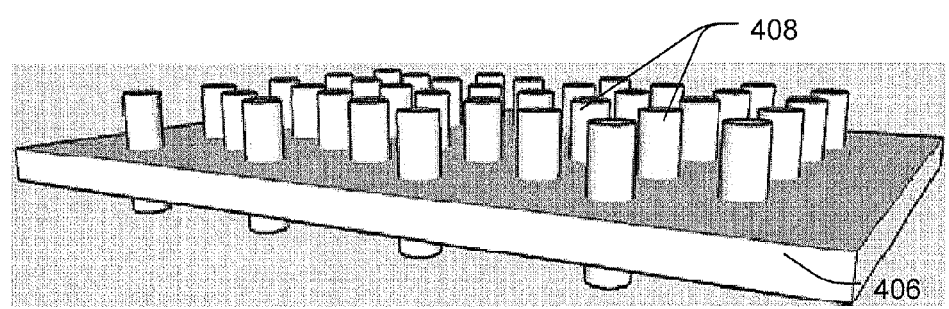

Referring to FIG. 8, the casting material 440 may be cured to form a plurality of thermally conductive extended plugs 408 through the ceramic foam member 406. After curing the casting material 440, the first casting layer 434 and the second casting layer 436 may be removed leaving the ceramic foam member 406 and the plurality of cured thermally conductive extended plugs 408 as a cold plate core.

Figure 9:
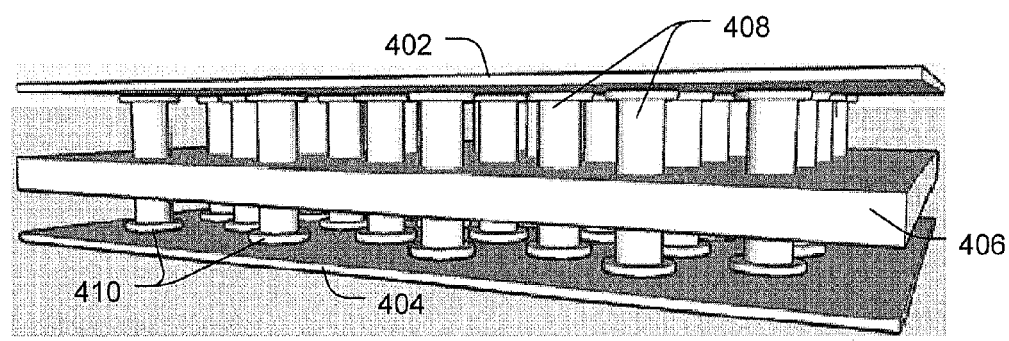

Referring to FIG. 9, a thermally conductive adhesive 410 may be used to apply a first side 402 of a housing to first ends of the plurality of thermally conductive extended plugs 408. Additionally, the thermally conductive adhesive 410 may be used to apply a second side 404 of the housing to second ends of the plurality of thermally conductive extended plugs 408. For example, the thermally conductive adhesive may include a thermally conductive room temperature vulcanizing (RTV) adhesive. In another example, the thermally conductive adhesive may include the casting material 440. When the heat exchange device being manufactured is a cold plate, the first side 402, the second side 404, or both may be thermally conductive. When the heat exchange device being manufactured is a thermal protection system, either the first side 402 or the second side 404 may be thermally insulating. Additionally, the first side 402, the second side 404, or both may have low electrical conductivity (e.g., a dielectric constant about 8.8). Further, an erosion resistant layer may be applied to the first side 402, the second side 404, or both.

Figure 10:
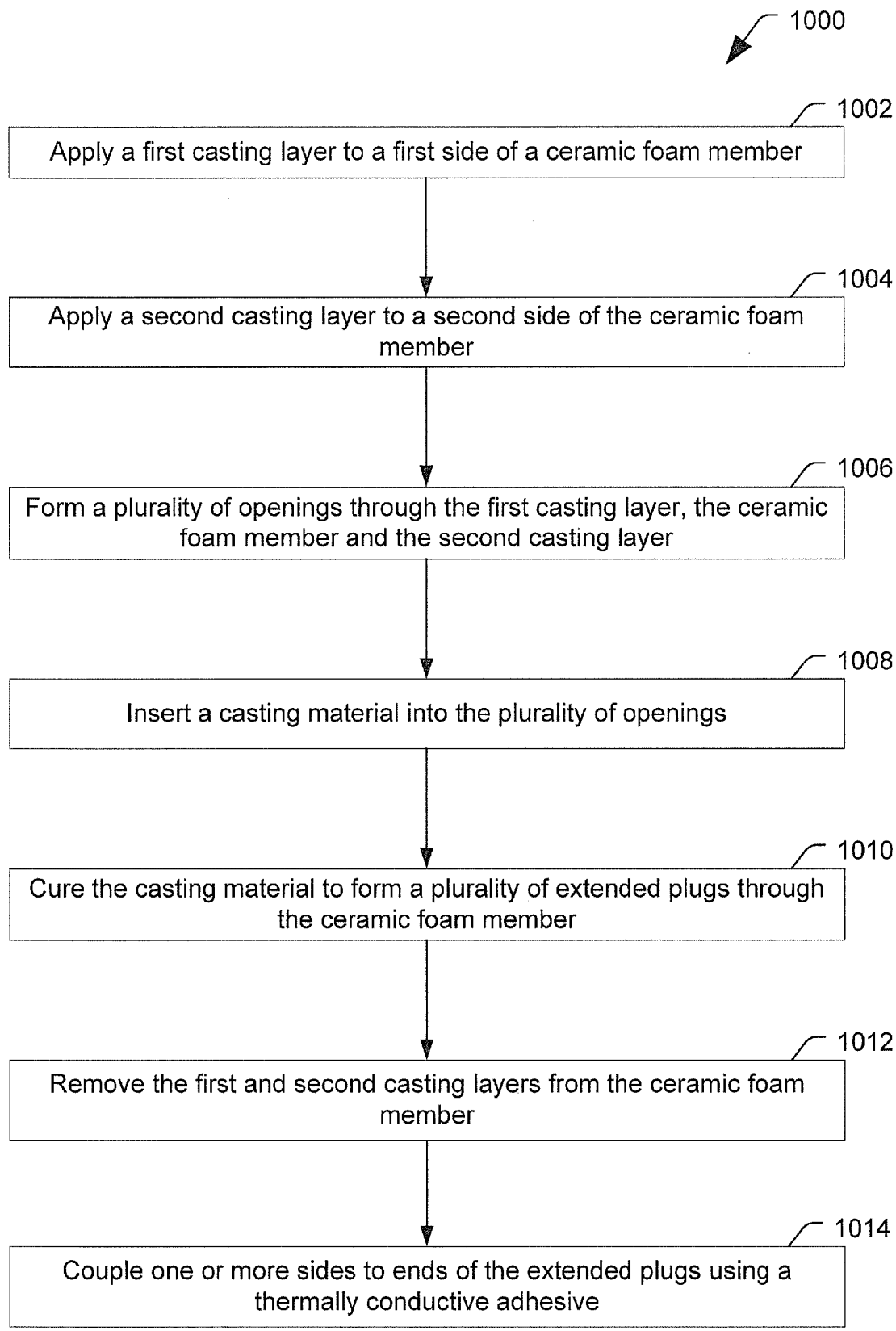
FIG. 10 is a flowchart of a particular embodiment of a method of manufacturing a heat exchange core.

FIG. 10 is a flowchart of a particular embodiment of a method of manufacturing a heat exchange core. The method is generally designated 1000. The method 1000 may be used to manufacture the heat exchange device 100 of FIG. 1, or the heat exchange device 200 of FIG. 2.

The method 1000 includes, at 1002, applying a first casting layer to a first side of a ceramic foam member. The method 1000 also includes, at 1004, applying a second casting layer to a second side of the ceramic foam member. In a particular embodiment, the ceramic foam member may be a high porosity foam with a porosity of about 90 percent and an average pore size of about 35 microns across, such as the ceramic foam described with reference to FIG. 3. The first and second casting layers may include a material that can be applied to and removed from the ceramic foam, in which casting openings can be formed and that is capable of retaining a casting material during curing of the casting material. For example, the first and second casting layers may include wax or silicone.

The method 1000 also includes, at 1006, forming a plurality of openings through the first casting layer, the ceramic foam member and the second casting layer. For example, the openings may be formed by drilling or otherwise machining openings through the first casting layer, the ceramic foam member and the second casting layer. The method 1000 may further include, at 1008, inserting a casting material into the plurality of openings. For example, the casting material may include a curable aluminum nitride material or other curable thermally conductive materials.

The method 1000 may also include, at 1010, curing the casting material to form a plurality of thermally conductive extended plugs through the ceramic foam member. The method 1000 may also include, at 1012, removing the first and second casting layers from the ceramic foam member. The plurality of thermally conductive extended plugs and the ceramic foam member form the heat exchange core. In a particular embodiment, a heat exchange device, such as a cold plate or thermal protection system, may be formed, at 1014, by coupling one or more sides to ends of the extended plugs using a thermally conductive adhesive to form a housing.

Figure 11:
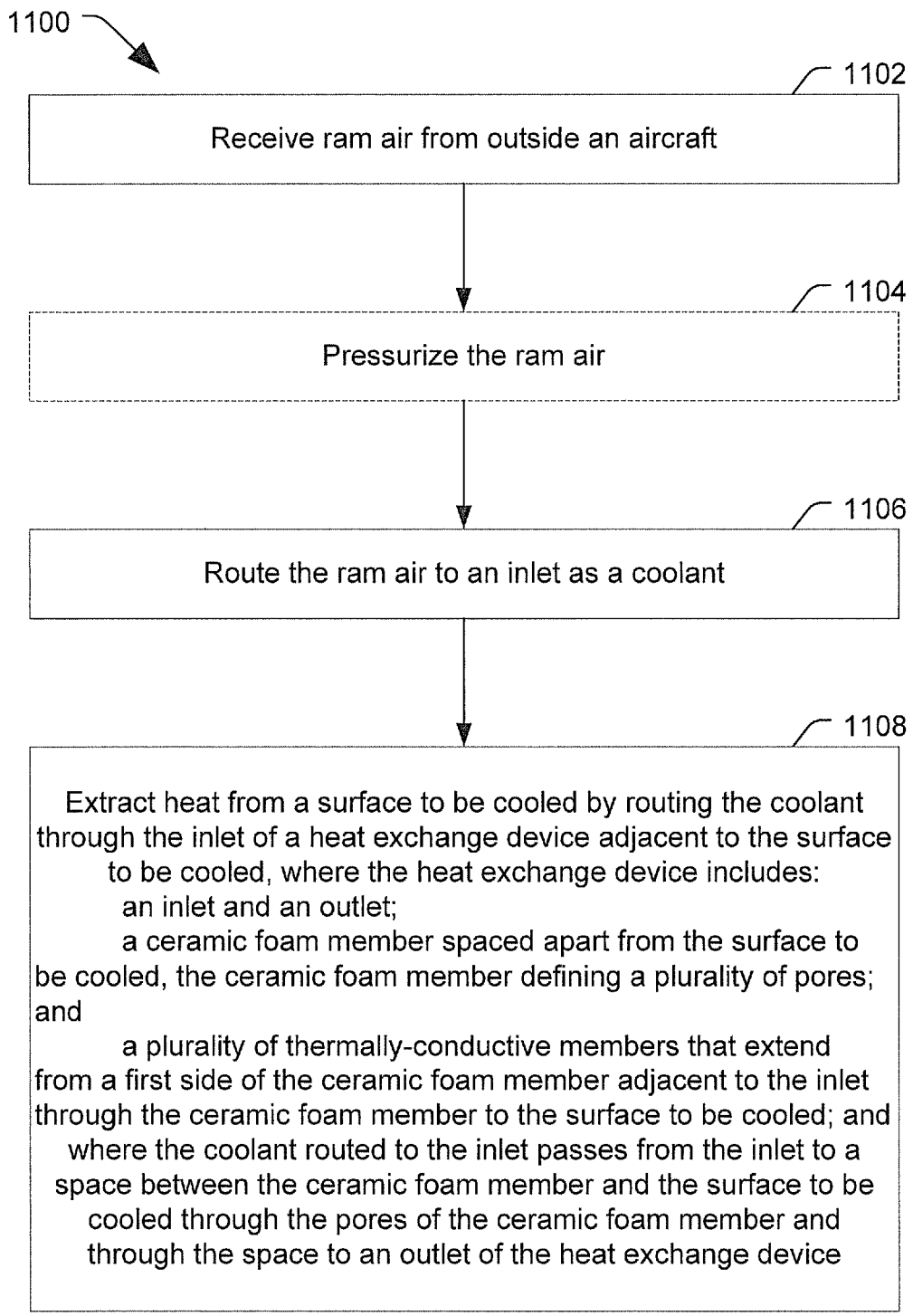
FIG. 11 is a flowchart of a particular embodiment of a heat exchange method.

FIG. 11 is a flowchart of a particular embodiment of a heat exchange method. The method is generally designated 1100. In various embodiments, the method 1100 may be performed using a heat exchange device, such as the heat exchange device 100 of FIG. 1, the heat exchange device 200 of FIG. 2, a heat exchange device manufactured using the method illustrated in FIGS. 4-9, or a heat exchange device manufactured using the method 1000 of FIG. 10.

The method 1100 includes receiving ram air from outside an aircraft, at 1102. For example, the ram air may be received via one or more inlet ports or via an airstream diverted from an engine inlet. In certain embodiments, the ram air may be further pressurized, at 1104, or otherwise treated, such as by pre-cooling the ram air before the ram air is routed for use as a coolant. In other embodiments, a coolant other than ram air may be used. For example, a liquid coolant may be used or a gaseous coolant other than ram air may be used. In another example, a phase-changing refrigerant material may be used as the coolant.

The method 1100 may also include, at 1106, routing the ram air to an inlet of a heat exchange device (e.g., a cold plate) as a coolant. At 1108, heat may be extracted from a surface to be cooled into the coolant routed through the inlet of the heat exchange device. The heat exchange device may be adjacent to a surface to be cooled. For example, the heat exchange device may be adjacent to a heat exposed surface, such as an engine exhaust nozzle or a leading edge of the aircraft. In another example, the heat exchange device may be adjacent to a heat generating device, such as a printed circuit board or other electronic device such as an avionics device.

The heat exchange device may include the inlet, an outlet and a ceramic foam member spaced apart from the surface to be cooled. The ceramic foam member may include a high porosity foam, such as the ceramic foam described with reference to FIG. 3. A plurality of thermally conductive extended plugs may extend from a first side of a ceramic foam member adjacent to the inlet through the ceramic foam member to the surface to be cooled. The coolant that is routed to the inlet may pass from the inlet to a space (or channel) between the ceramic foam member and the surface to be cooled through pores of the ceramic foam member. The coolant may pass through the space between the ceramic foam member and the surface to be cooled to an outlet of a heat exchange device. In a particular embodiment, the coolant may pass a second time through pores of the ceramic foam member prior to reaching the outlet.

Figure 12:
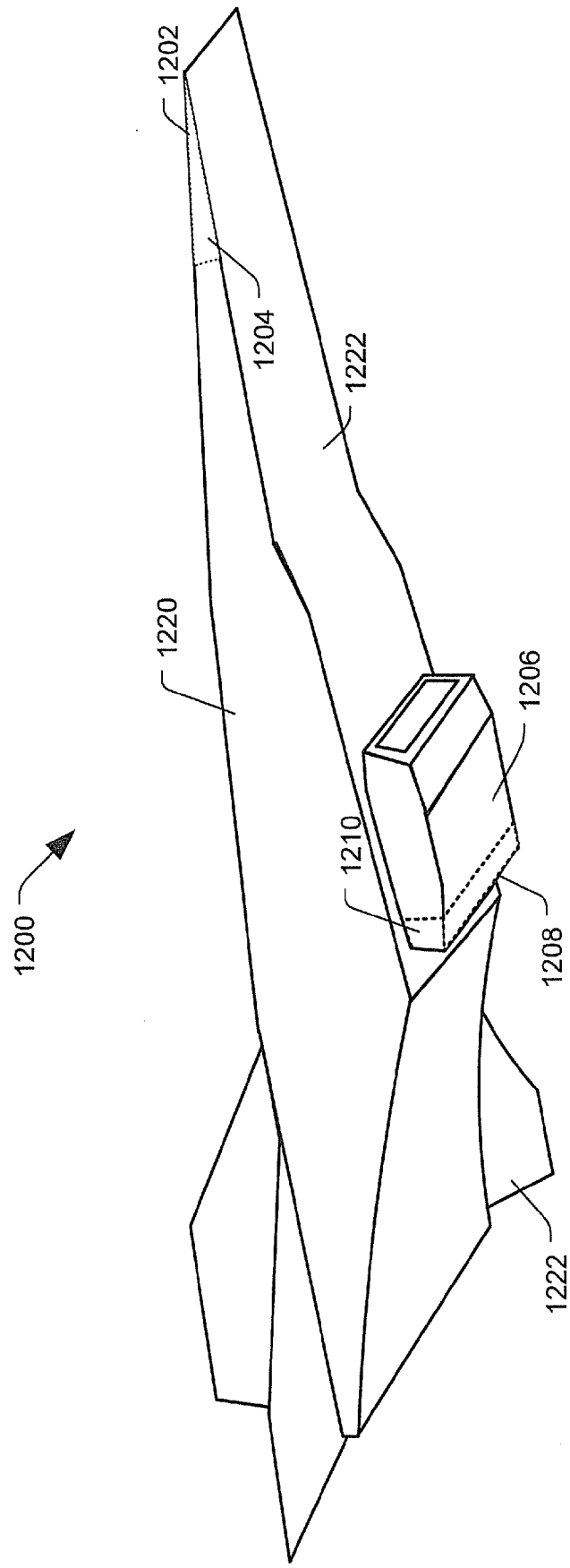
FIG. 12 is a diagram of a particular embodiment of an aircraft including one or more heat exchange devices.

FIG. 12 is a diagram of a particular embodiment of an aircraft 1200 including one or more heat exchange devices. For example, the heat exchange devices may include the heat exchange device 100 illustrated in FIG. 1, the heat exchange device 200 illustrated in FIG. 2, or a combination thereof. The aircraft 1200 may also include at least one engine 1206, a fuselage 1220, and a plurality of wings or other lift generating surfaces 1222.

The aircraft 1200 includes one or more surfaces that are exposed to high heat flux. In a particular embodiment, the surfaces experiencing heating may include an exterior surface of the aircraft. For example, the heat exposed surfaces may include a surface 1202 that may be heated due to frictional contact with surrounding air, especially during high-speed flight. In another particular embodiment, the heat exposed surfaces may include a surface of an engine exhaust nozzle 1208 of the at least one engine 1206. The exhaust nozzle 1208 may include one or more heat exposed surfaces (not shown), such as interior surfaces of the exhaust nozzle 1208.

The heat exchange devices of the aircraft 1200 may include one or more cold plates adjacent to the heat exposed surfaces. For example, a first cold plate 1204 may be adjacent to the first heat exposed surface 1202. The first cold plate 1204 may be adapted to remove heat from the first heat exposed surface 1202. Additionally, a second cold plate 1210 may be located at or adjacent to the exhaust nozzle 1208 of one or more engines 1206. In a particular embodiment, the cold plates 1204 and 1210 include an inlet to receive a coolant and an outlet to route the coolant away from the cold plates 1204 and 1210. The cold plates 1204 and 1210 may also include one or more ceramic foam members inside the cold plates 1204 and 1210. The one or more ceramic foam members define a plurality of pores. For example, the one or more ceramic foam members may include a ceramic foam as described with reference to FIG. 3. The cold plates 1204 and 1210 may also include a plurality of thermally conductive extended plugs that extend from a first side of the cold plate separated from the heat exposed surface through the ceramic foam member to a second side of the cold plate adjacent to the heat exposed surface. The second side of a heat exposed surface may be separated from the ceramic foam member by ends of the thermally conductive extended plugs. In a particular embodiment, the heat exposed surface may include a thermally conductive erosion resistant layer that is thermally coupled to first ends of the plurality of thermally conductive extended plugs.

Figure 13:
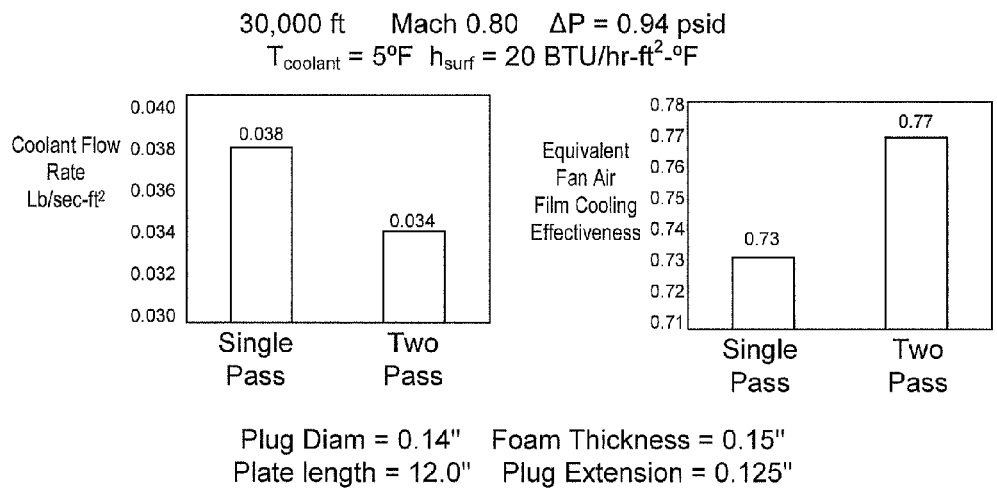
FIGS. 13 and 14 are charts of performance characteristics resulting from testing of heat exchange devices according to particular embodiments.
Figure 14:
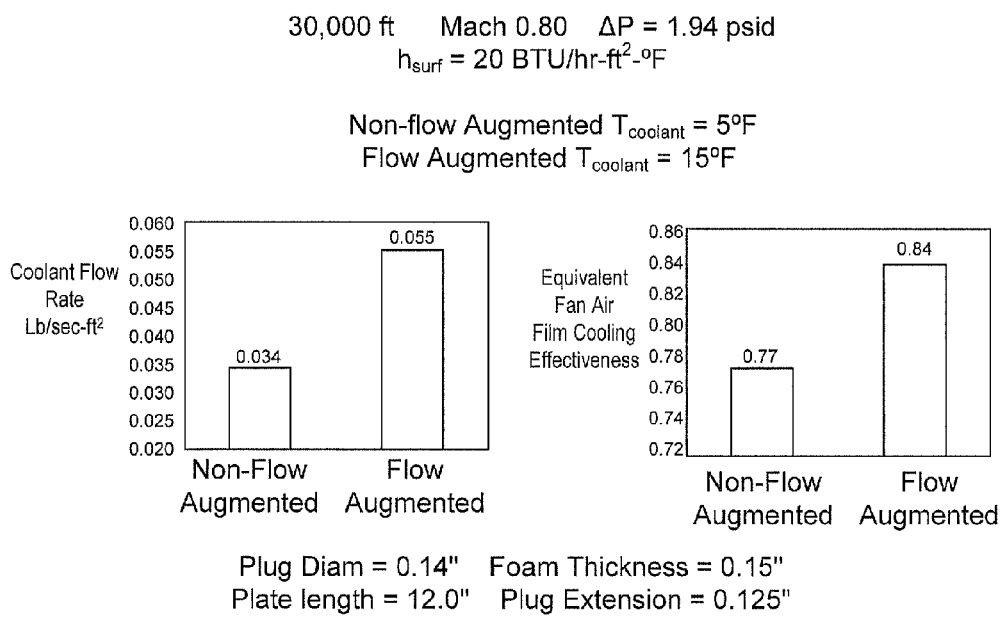

FIGS. 13 and 14 are charts of simulated performance characteristics of heat exchange devices according to particular embodiments. FIG. 13 includes two charts of simulated performance characteristics of the heat exchange device 100 illustrated in FIG. 1, referred to in FIG. 13 as a "single pass" configuration, and the heat exchange device 200 illustrated in FIG. 2, referred to in FIG. 13 as a "two pass" configuration. The performance characteristics are simulated for the heat exchange devices using ram air as the coolant, where the ram air is received at flight conditions including an altitude of 30,000 feet and a speed of Mach 0.8. The ram air temperature is estimated to be 5° F. An allowable coolant pressure drop based on ram air for these flight conditions is set to 0.94 pounds per square inch (psid). Additionally, the heat transfer coefficient ($h_{surf}$) for a high heat flux surface of the aircraft is set at 20 BTU/hr-ft$^2$-° F.

The performance characteristics are simulated for the heat exchange devices based on a six inch long cold plate that has been analytically extended to twelve inches long for both a single pass and a two pass design. The simulated heat exchange devices include extended plugs arranged in a row with approximately 0.245 inches between rows and extended plugs in each row set at about 0.49 inches on center. Each thermally conductive extended plug had a diameter (Plug Diam) of 0.14 inches and extended past the ceramic foam member (Plug Extension) by approximately 0.125 inches. The ceramic foam member had a thickness (Foam Thickness) of approximately 0.15 inches, and the total length of the cooling device (Plate Length) was 12 inches.

As shown in FIG. 13, the expected coolant flow rate in pounds per second per square foot (Lb/sec-ft$^2$) for the single pass configuration is approximately 0.038 and for the two pass configuration is approximately 0.034. Thus, the two pass configuration may achieve desired cooling with a lower coolant flow rate.

FIG. 13 also illustrates a simulated equivalent fan air film cooling effectiveness for each configuration of the heat exchange device. The equivalent fan air film cooling effectiveness relates the temperature achieved at the interface between an extended plug cold plate and a hot gas to the corresponding film cooling effectiveness. For the single pass configuration the equivalent fan air film cooling effectiveness is approximately 0.73 and for the two pass configuration the equivalent fan air film cooling effectiveness is approximately 0.77. Thus the two pass cold plate produces a greater degree of cooling with less coolant flow than is the case for the single pass cold plate. These values also illustrate that both the single and the two pass configurations can match the cooling associated with aggressive film cooling, but with an order of magnitude lower coolant flow rate.

FIG. 14 includes two charts of simulated performance characteristics of the two pass cold plate 200 illustrated in FIG. 2. FIG. 14 illustrates additional improvements that can be achieved using the two pass configuration when the ram air is augmented, by increasing the ram air supply pressure. Augmenting the ram air may increase the coolant flow rate significantly, further improving the equivalent fan air film cooling effectiveness of the two pass configuration of the heat exchange device by reducing the surface temperature.

The simulated performance data illustrated in FIG. 14 compares a non-flow augmented case to a flow augmented case for both coolant flow rate and equivalent fan air film cooling effectiveness. This comparison is made using the two pass cold plate configuration and vehicle flight condition defined with reference to FIG. 13. Flow augmentation through pressurization of the ram air coolant results in an increase in supply pressure of 1.0 psi to an 1.94 psid coolant flow pressure drop and an increase in supply temperature to 15° F. Flow augmentation results in an increase in coolant flow to 0.055 lbs/sec-ft2 from 0.034 lbs/sec-ft2 for the non-flow augmented case. This increase in coolant flow leads to an increase in equivalent fan air film cooling effectiveness to 0.84 from 0.77 for the non-flow augmented case. This shows that a significant reduction in surface temperature is possible for a relatively low level of flow augmentation, as measured by the increase in coolant supply pressure.

Although certain embodiments have been described here with reference to aircraft, the heat exchange devices disclosed herein are not limited to use in aircraft. Rather, any vehicle that uses a heat exchange device for thermal protection, cooling of components or for other purposes may benefit from the reduced equipment and operation costs associated with the disclosed heat exchange devices. To illustrate, spacecraft, land-based vehicles, and water-based vehicles may benefit from use of the disclosed heat exchange devices to provide thermal protection and heat management. Additionally, the disclosed heat exchange devices may provide reduced equipment cost and reduced operating cost for non-mobile uses, such as thermal management in buildings or other structures. Further, different coolants may be used depending on operational constraints of the system being cooled. To illustrate, for stationary or slow moving systems, air cooling may not be sufficient. Accordingly a liquid or phase-change coolant may be used. Additionally, although embodiments described herein have described thermal management with reference to providing cooling, the heat exchange devices disclosed may similarly be used for heating. That is, rather that using a relatively cold material (e.g., a coolant) to remove heat from a heat source via a surface of a heat exchange device, the heat exchange device may receive heat from a relatively hot material and provide the heat to a heat sink via the surface of the heat exchange device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A heat exchange device, comprising:
    a housing defining an inlet and an outlet, wherein the housing is configured to extract heat from a heat exposed surface;
    at least one ceramic foam member inside the housing, the at least one ceramic foam member defining a plurality of pores;
    a plurality of extended plugs that extend from a first side of the housing through the at least one ceramic foam member to a second side of the housing, wherein the first side of the housing is spaced apart from the at least one ceramic foam member by first ends of the plurality of extended plugs, and wherein the second side of the housing is spaced apart from the at least one ceramic foam member by second ends of the plurality of extended plugs; and
    a coolant impermeable dam, wherein the coolant impermeable dam is positioned on the first side of the at least one ceramic foam member, wherein the inlet is on a first side of the coolant impermeable dam, wherein the outlet is on a second side of the coolant impermeable dam, wherein the coolant impermeable dam is configured to divert a coolant on the first side of the coolant impermeable dam to a second side of the at least one ceramic foam member, wherein the second side of the at least one ceramic foam member is opposite the first side of the at least one ceramic foam member, and wherein the coolant diverted to the second side of the at least one ceramic foam member flows through the at least one ceramic foam member to the outlet on the second side of the coolant impermeable dam.

2. The heat exchange device of claim 1, wherein the plurality of extended plugs comprise aluminum nitride plugs.

3. The heat exchange device of claim 1, wherein the at least one ceramic foam member comprises a plurality of irregularly-oriented ceramic fibers defining the plurality of pores.

4. The heat exchange device of claim 1, wherein, as the coolant is diverted from the first side of the at least one ceramic foam member to the second side of the at least one ceramic foam member by the coolant impermeable dam, the coolant flows through:
   a thickness of the at least one ceramic foam member via the plurality of pores; and
   a space between the second side of the housing and the at least one ceramic foam member.

5. The heat exchange device of claim 4, wherein the coolant flows from the space between the second side of the housing and the at least one ceramic foam member to the outlet through:
   the at least one ceramic foam member via the plurality of pores; and
   a space between the first side of the housing and the at least one ceramic foam member.

6. The heat exchange device of claim 1, wherein the first side of the housing includes a thermally conductive layer.

7. The heat exchange device of claim 1, wherein the first side of the housing comprises aluminum nitride.

8. The heat exchange device of claim 7, wherein the first side of the housing further comprises a plurality of alumina-silica fibers.

9. The heat exchange device of claim 1, wherein the first side of the housing is coupled to the first ends of the plurality of extended plugs by a thermally conductive adhesive.

10. The heat exchange device of claim 9, wherein the thermally conductive adhesive comprises a room-temperature vulcanized (RTV) adhesive.

11. The heat exchange device of claim 1, wherein the inlet and the outlet are on a first side of the at least one ceramic foam member.

12. A method, comprising:
   applying a first casting layer to a first side of a ceramic foam member;
   applying a second casting layer to a second side of the ceramic foam member;
   forming a plurality of openings through the first casting layer, the ceramic foam member and the second casting layer;
   inserting a casting material into the plurality of openings;
   curing the casting material to form a plurality of extended plugs through the ceramic foam member;
   removing the first casting layer and the second casting layer from the ceramic foam member;
   coupling a first side member to first ends of the plurality of extended plugs, wherein the first side member is spaced apart from a first side of the ceramic foam member by the first ends of the plurality of extended plugs;
   coupling a second side member to second ends of the plurality of extended plugs, wherein the second side member is spaced apart from a second side of the ceramic foam member by the second ends of the plurality of extended plugs; and
   positioning a coolant impermeable dam between the first side member and the ceramic foam member, wherein the coolant impermeable dam is positioned on the first side of the ceramic foam member, wherein an inlet is on a first side of the coolant impermeable dam, wherein an outlet is on the second side of the coolant impermeable dam, wherein the coolant impermeable dam is configured to divert a coolant on the first side of the coolant impermeable dam to the second side of the ceramic foam member, wherein the second side of the ceramic foam member is opposite the first side of the ceramic foam member, and wherein the coolant diverted to the second side of the ceramic foam member flows through the ceramic foam member to the outlet on the second side of the coolant impermeable dam.

13. The method of claim 12, wherein the casting material comprises a castable aluminum nitride material.

14. The method of claim 12, wherein at least one of the first casting layer and the second casting layer comprises at least one of a wax layer and a silicone layer.

15. The method of claim 12, wherein the first side member is coupled to the first ends of the plurality of extended plugs using a thermally conductive adhesive and wherein the second side member is coupled to the second ends of the plurality of extended plugs using the thermally conductive adhesive.

16. An aircraft, comprising:
   a heat-exposed surface; and
   a cooling plate adjacent to the heat-exposed surface, the cooling plate including:
      an inlet and an outlet;
      at least one ceramic foam member inside the cooling plate, the at least one ceramic foam member defining a plurality of pores;
      a plurality of thermally conductive extended plugs that extend from a first side of the cooling plate through the ceramic foam member to a second side of the cooling plate, wherein the first side of the cooling plate or the second side of the cooling plate is adjacent to the heat-exposed surface, wherein the first side of the cooling plate is spaced apart from the at least one ceramic foam member by first ends of the plurality of thermally conductive extended plugs, and wherein the second side of the cooling plate is spaced apart from the at least one ceramic foam member by second ends of the plurality of thermally conductive extended plugs; and
      a coolant impermeable dam wherein the coolant impermeable dam is positioned on the first side of the at least one ceramic foam member, wherein the inlet is on a first side of the coolant impermeable dam, wherein the outlet is on a second side of the coolant impermeable dam, wherein the coolant impermeable dam is configured to divert a coolant on the first side of the coolant impermeable dam to a second side of the at least one ceramic foam member, wherein the second side of the at least one ceramic foam member is opposite the first side of the at least one ceramic foam member, and wherein the coolant diverted to the second side of the at least one ceramic foam member flows through the at least one ceramic foam member to the outlet on the second side of the coolant impermeable dam.

17. The aircraft of claim 16, wherein the heat-exposed surface includes an exterior surface of the aircraft.

18. The aircraft of claim 16, further comprising at least one engine, a fuselage, and a plurality of wings.

19. The aircraft of claim 18, wherein the heat-exposed surface includes a surface of a jet engine nozzle of the at least one engine.

20. The aircraft of claim 16, wherein the heat-exposed surface comprises a thermally conductive erosion resistant layer that is thermally coupled to the first ends of the plurality of thermally conductive extended plugs.

21. A method, comprising:
   extracting heat from a surface to be cooled by routing a coolant to an inlet of a heat exchange device adjacent to the surface to be cooled;

wherein the heat exchange device includes:
- an inlet and an outlet;
- a ceramic foam member defining a plurality of pores;
- a plurality of thermally conductive extended plugs that extend from a first side of the ceramic foam member adjacent to the inlet through the ceramic foam member to a second side of the ceramic foam member; and
- a coolant impermeable dam wherein the coolant impermeable dam is positioned on the first side of the ceramic foam member, wherein the inlet is on a first side of the coolant impermeable dam, wherein the outlet is on a second side of the coolant impermeable dam, wherein the coolant impermeable dam is configured to divert a coolant on the first side of the coolant impermeable dam to a second side of the ceramic foam member, wherein the second side of the ceramic foam member is opposite the first side of the ceramic foam member, and wherein the coolant diverted to the second side of the ceramic foam member flows through the ceramic foam member to the outlet on the second side of the coolant impermeable dam, wherein a first side of the heat exchange device is spaced apart from the ceramic foam member on the first side of the ceramic foam member by first ends of the plurality of thermally conductive extended plugs, and wherein a second side of the heat exchange device adjacent to the surface to be cooled is spaced apart from the ceramic foam member by second ends of the plurality of thermally conductive extended plugs.

* * * * *